United States Patent
Larikka et al.

(10) Patent No.: US 6,349,099 B1
(45) Date of Patent: Feb. 19, 2002

(54) CONNECTION IDENTIFICATION IN TRANSMISSION SYSTEM OF WIRELESS TELECOMMUNICATION NETWORK OVER ATM PROTOCOL STACK

(75) Inventors: Tapani Larikka, Helsinki; Jussi Rajala; Sami Virtanen, both of Espoo, all of (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/460,158

(22) Filed: Dec. 13, 1999

Related U.S. Application Data

(63) Continuation of application No. PCT/FI98/00504, filed on Jun. 11, 1998.

(30) Foreign Application Priority Data

Jun. 13, 1997 (FI) .................................. 972535

(51) Int. Cl.$^7$ ........................ H04L 12/28; H04L 12/56
(52) U.S. Cl. ...................................... 370/395; 370/469
(58) Field of Search ................................ 370/328, 410, 370/467, 469, 522, 524, 905, 454, 465, 466, 471, 476, 496

(56) References Cited

U.S. PATENT DOCUMENTS

| | | | | |
|---|---|---|---|---|
| 5,519,690 A | * | 5/1996 | Suzuka et al. | 424/193.1 |
| 5,748,636 A | * | 5/1998 | Gradischnig | 455/432 |
| 5,828,403 A | * | 10/1998 | DeRodeff et al. | 370/395 |
| 6,061,364 A | * | 5/2000 | Hager et al. | 370/467 |
| 6,119,000 A | * | 9/2000 | Stephenson et al. | 725/131 |

FOREIGN PATENT DOCUMENTS

| | | |
|---|---|---|
| EP | 0366342 | 5/1990 |
| EP | 0426269 | 5/1991 |
| EP | 0679042 | 10/1995 |
| EP | 0 762 798 | 3/1997 |
| GB | 2268359 | 1/1994 |
| WO | WO 93/19559 | 9/1993 |
| WO | WO 94/00959 | 1/1994 |

OTHER PUBLICATIONS

GSM 08.06, European Telecommunications Standards Institute, France, Sep. 1994.

Copy of International Search Report for PCT/FI98/00504.

\* cited by examiner

*Primary Examiner*—Douglas Olms
*Assistant Examiner*—Phirin Sam
(74) *Attorney, Agent, or Firm*—Altera Law Group, LLC

(57) ABSTRACT

The invention relates to wireless telecommunication systems employing ATM technique (Asynchronous Transfer Mode) in transmission systems. A signalling arrangement between network elements comprises a protocol stack comprising on top a layer 3 user function for signalling between a wireless mobile station and a network, an ATM adaptation layer, an ATM layer and a physical later. In accordance with the invention the ATM adaptation later comprises on top a service-specific coordination function immediately between said higher user function and a service-specific connection-oriented protocol. Said service-specific coordination function comprises as functions the adaptation of the user function to the service-specific connection-oriented protocol and the establishment, discrimination and release of the signalling connections of the ATM adaptation later needed for conveying signalling messages of the layer user function. The invention provides a simple protocol stack that is easy to implement. The efficiency of the protocol stack also increases as the number of layers decreases.

4 Claims, 4 Drawing Sheets

CONNECTION IDENTIFICATION IN TRANSMISSION SYSTEM OF WIRELESS TELECOMMUNICATION NETWORK OVER ATM PROTOCOL STACK

This application is a contituation of PCT/FI98/00504 filed Jun. 11, 1998.

FIELD OF THE INVENTION

The invention relates to wireless telecommunication systems employing ATM technique (Asynchronous Transfer Mode) in transmission systems.

BACKGROUND OF THE INVENTION

In mobile networks, radio interfaces have conventionally been narrowband. Mobile network transmission systems have conventionally been implemented with circuit-switched connections using a star or tree network configuration. Examples of prior art mobile systems are the pan-European digital mobile communication system GSM and the Personal Communications System PCS (standard PN-3343) developed in the USA, the network architecture of which is illustrated in FIG. 1. A set of base station systems BSS (a radio system RS in the PCS system) is connected to a mobile switching centre 10 (a Mobile services switching centre MSC in the GSM system, a Personal services switching centre in the PCS system). The base station system BSS comprises base station controllers BSC and base stations BTS. Mobile stations MS communicate over a radio path with the base stations BTS. There is a GSM-based interface A or a PCS-specific interface A between the mobile switching centre 10 and the base station controller BSC. interface A have originally been built for a PCM transmission system or the like. FIG. 2 illustrates an interface A signalling protocol model between the mobile switching centre 10 and the base station system BSS (or the radio system RS).

Interface A is based on an ANSI/CCITT signalling system number 7 (SS7) comprising several layers: an SCCP, an MTP and a physical layer. When a digital PCM link is used between the BSC and the mobile switching centre 10, the signalling of the physical layer is transferred in one or more time slots of 56 or 64 kbit/s. The following higher layers at interface A are an MTP (message transfer part) and an SCCP (signalling connection and control part). The MTP and the SCCP are used to support signalling messages between the mobile switching centre 10 and the BSS.

At present one SCCP user function called a BSSAP (BSS application part) or a RSAP (radio system application part) is determined in the PCS system. The BSSAP (or RSAP) uses one signalling connection for each active MS comprising signalling transactions for transferring layer 3 messages. The BSSAP (RSAP) user function is further divided into two separate functions:

a DTAP (direct transfer application part) is used to transfer call control and mobility management messages between the mobile switching centre 10 and the MS. The BSS does not interpret the DTAP information carried in these messages. Specification GSM 08.06 comprises more details associated with handling DTAP messages in the BSS, multiplexing messages to relevant signalling channels of the radio path and employing SCCP services. Layer 3 protocols for information exchange between MS-MSC are described in series 4 of the GSM specifications.

a BSSMAP (BSS management application sub-part) or a RSMAP (radio system application sub-part) in the PCS system supports other procedures between the mobile switching centre 10 and the BSS relating to the MS (handover control 14 ms) or a cell within the BSS or the entire BSS. In other words, the BSSMAP (RSMAP) supports all the procedures between the mobile switching centre 10 and the BSS (RS) requiring interpretation and handling of information associated with individual calls and resource management.

Discrimination associated with the two sublayers DTAP and BSSMAP (RSMAP) is performed in an intermediate layer between the SCCP and layer 3. The intermediate layer is called a distribution sublayer or a distribution function. The layer 3 DTAP and BSSMAP (RSMAP) messages transferred between the mobile switching centre 10 and the BSS are included in user data fields of the SCCP messages. The user data field also comprises a distribution data unit that the distribution function uses for distributing messages between the BSSMAP and the DTAP functions and for distributing/multiplexing the DTAP messages into different access points in a radio link layer.

To increase the capacity and flexibility of transmission systems the use of different broadband packet-switched transmission systems has also been proposed e.g. in WO 9319559, WO 9400959 and EP 0366342 for mobile services networks. EP0426269 describes a mobile system in which base stations are connected by routers to ATM network switches. Virtual connections controlled by the base stations are established between the base stations through the ATM network. Elementary mobility management is based on routing tables maintained at base stations and in ATM switches and updated as subscribers move. GB 2268359 and EP 679042 describe an ATM access network comprising permanent ATM virtual connections (for speeding up call switching) between base stations and a mobile network interface, the connections being allocated call by call.

A possible future development trend is mobile systems that have a broadband radio interface. Then the transmission system of the mobile system also has to be broadband, while a potential alternative is ATM technique.

At present third generation mobile systems, such as Universal Mobile Communication System (UMTS) and Future Public Land Mobile Telecommunication System (FPLMTS) later renamed as IMT-2000 (International Mobile Telecommunication 2000), are being developed. The UMTS is being standardized in ETSI (European Telecommunication Standards Institute) whereas ITU (International Telecommunication Union) is standardizing the IMT-2000 system. These future systems are basically very alike. In the following the UMTS system will be described in greater detail.

According to the present view the UMTS consists of two or three parts illustrated in FIG. 3: a UMTS access network (or a UMTS base station system, UMTS-BSS) and a core network 2, 3, 4 and 5. Below the UMTS access network is generally also referred to as a radio access network. The UMTS access network is mainly responsible for matters associated with the radio path i.e. offers the core network a radio access needed for wireless operations. The core network 2, 3, 4 or 5 is a conventional or future telecommunication network modified to efficiently utilize the UMTS access network in wireless communication. Telecommunication networks that are thought to be suitable core networks are second generation mobile systems, such as GSM (Global System for Mobile Communication), ISDN (Integrated Services Digital Network), B-ISDN (Broadband integrated Services Digital Network), PDN (Packet Data Network), ATM (Asynchronous Transfer Mode) etc. One of the most probable transmission techniques in access network is the ATM.

The ATM transmission technique is a switching and multiplexing solution particularly relating to a data link layer (i.e. OSI Layer 2, hereinafter referred to as an ATM layer), enabling the implementation of a connectionoriented packet network in the B-ISDN networks (Broadband Integrated Services Digital Network).

In ATM data transmission the end user's data traffic is carried from a source to a destination through virtual connections. Data is transferred over switches of the network in standard-size packets called ATM cells. An ATM cell comprises a header, the main object of which is to identify a connection number for a sequence of cells forming a virtual channel for a particular call. A physical layer (i.e. OSI Layer 1) may comprise several virtual paths multiplexed in the ATM layer. The virtual paths are identified by a Virtual Path Identifier (VPI). Each virtual path may comprise a number of virtual channels identified by a Virtual Channel Identifier (VCI). The ATM cell comprises indirectly information on the receiver's address. each cell thus being an independent data transmission unit. Above the ATM layer there are the procedures of ATM Adaptation Layer (AAL) which adapt the ATM layer to the higher layers.

The ATM is a connection-oriented traffic technique, but since there is no connection before it is established, a connection establishment request has to be routed from a source through the ATM network to a destination approximately in the same way as packets are routed in packet-switched networks. After the connection has been established the packets travel along the same virtual path during the connection.

It would be preferable if the mobile systems using ATM transmission systems could use components and protocols of available mobile systems as much as possible.

However, the introduction of ATM technique as the transmission technique of mobile networks brings about changes, for example, in the protocol structure of interface A shown in FIG. 2, as the physical layer does not comprise a PCM link but an ATM layer and higher layers referred to as AAL layers supporting the ATM layer. FIG. 4 shows a known protocol stack formed by existing protocols. In other words, the protocol layers BSSAP, SCCP and MTP3 described above with reference to FIG. 2 are as such connected to the AAL layer according to ITU-T standards and supporting an MPT layer 3 (MPT3). For SSCF (Service Specific Coordination Function) signalling the highest AAL layer is at a network node interface (NNI) defined in ITU-T standard Q.2140. One SSCF user application is MTP3, to which the SSCF offers an adaptation to a lower AAL layer SSCOP (Service Specific Connection Oriented Protocol). The SSCOP is defined in ITU-T standard Q.2110. One of the objects of the SSCOP is the control (establishment, release, resynchronization) of SSCOP connections. A CPCS (Common Part Convergence Sublayer) and a SAR (Segmentation And Reassembly) are below a SSCOP layer. The ATM layer and the physical layer are at the bottom.

SUMMARY OF THE INVENTION

An object of the present invention is to provide a more optimal protocol solution for ATM-based transmission systems in wireless telecommunication systems.

This is achieved with a signalling arrangement between network elements in a wireless telecommunication system having an ATM-based transmission system, the arrangement comprising a protocol stack which comprises on top a layer 3 user function for signalling between a wireless mobile station (MS) and a network, an ATM adaptation layer, an ATM layer and a physical layer. In accordance with the invention the ATM adaptation layer comprises on top a service-specified coordination function (SSCF) immediately between said higher user function and a service-specified connection-oriented protocol (SSCOP), said service-specified coordination function comprising as functions the adaptation of the user function to the service-specified connection-oriented protocol and the establishment, discrimination and release of the signalling connections of the ATM adaptation layers needed for conveying signalling messages of the layer 3 user function.

In the invention, a protocol stack comprises a new SCCF located between the SSCOP and the user function, e.g. BSSAP or RSAP, while the SCCP, MTP3 and the SSCF according to ITU-T Q.2140 present in the prior art protocol stack, are omitted. The new SSCF comprises as functions the adaptation of the user function to the SSCOP and the discrimination and control of various connections previously performed in the SCCP. The remaining AAL sublayers SSCOP, CPCS and SAR are in accordance with ITU-T standards, as well as the ATM layer and the physical layer.

The invention is based on the observation that the prior art protocol stack includes two partly overlapping connection control mechanisms, SCCP and SSCOP. Error detection, receipt confirmation and flow control are not needed in the SCCP, since the SSCOP provides these functions. The SCCP segmenting/reassembling function is not either needed, since the SAR provides the segmenting and reassembling needed. Such a double functionality does not seem sensible as the most important SCCP part to be used would be the ability to discriminate several connections using reference numbers given to the connections. This minimal advantage that the SCCP offers is not enough to entitle the implementation of the SCCP and MTP3. Omitting MTP3 also renders the SSCF according to ITU-T Q.2140 unnecessary. All these layers are efficiently replaced with a new SSCF according to the invention in which said control of several connections using reference numbers and the user function/SSCOP adaptation are implemented.

A simpler protocol stack that is easier to implement is achieved with the invention. The efficiency of the protocol stack increases as the number of layers decreases. This is, for example, due to the fact that removing unnecessary layers and overlapping functions reduce the number of header information connected with the original user message, thus shortening the message length. This in turn leads to a more efficient utilization of a transmission band in the transmission system.

BRIEF DESCRIPTION OF THE DRAWINGS

In the following the invention will be described in greater detail by means of the preferred embodiments with reference to the accompanying drawings, in which.

DETAILED DESCRIPTION OF THE DRAWINGS

The preferred embodiments of the invention are in the following described as implemented in the GSM or PCS type mobile system in signalling between a mobile switching centre and a base station controller. However, the aim is not to restrict the invention to these embodiments. The invention is applicable to be used in any wireless telecommunication system comprising an ATM-based transmission technique. One application area is radio access networks such as UMTS and FPLMTS.

Figure 3:
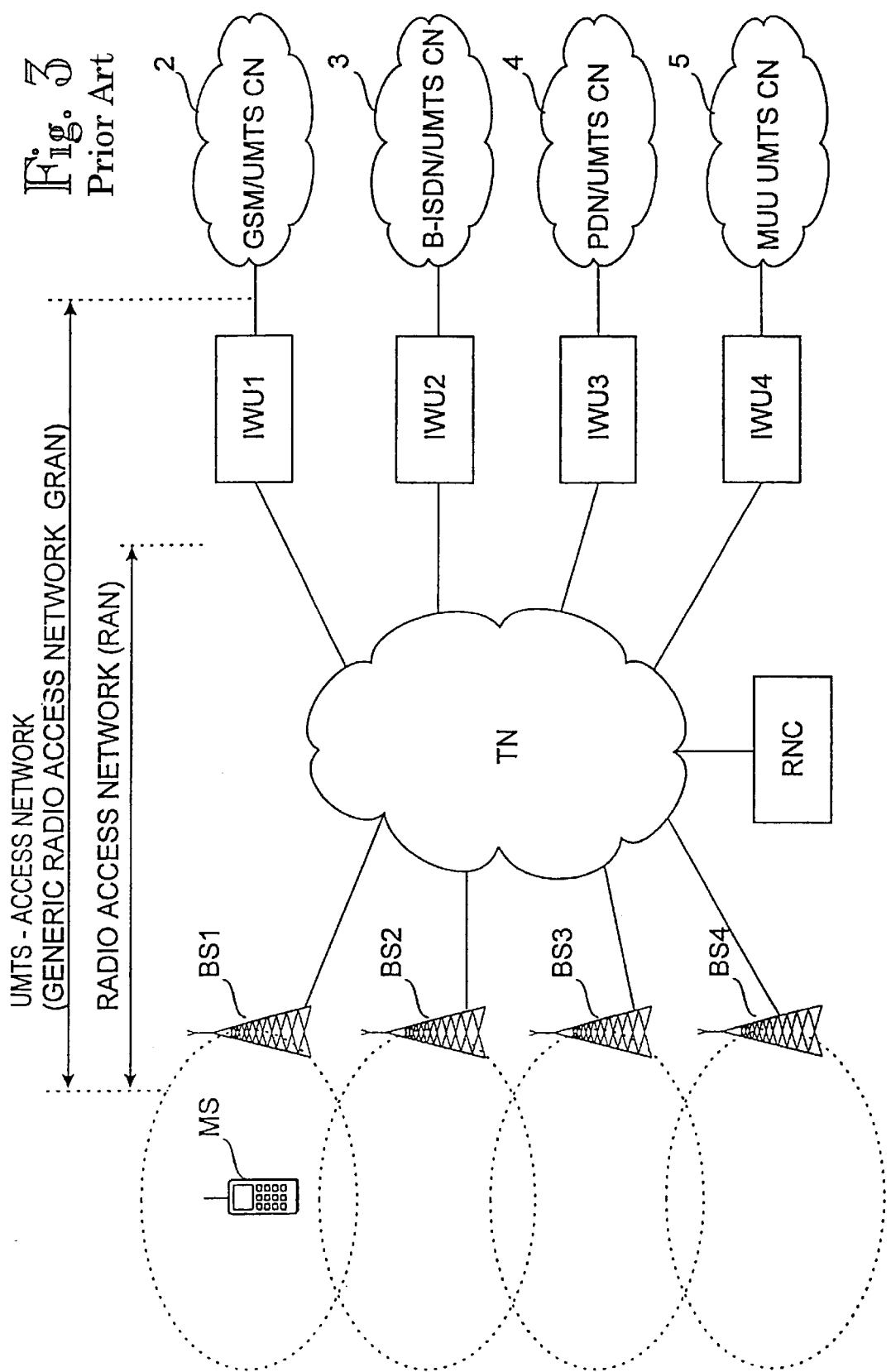
FIG. 3 illustrates the structure of a wireless access network.

An architecture of a UMTS access network is described in the following in greater detail referring again to FIG. 3. It should, however, be noted that this network architecture is only one of several alternatives and the detailed structure of the UMTS network is not significant regarding the invention. The network architecture shown in FIG. 3 is based on a scenario that the UMTS access network operations are strictly limited to radio access functions. The network architecture thus basically comprises functions for controlling radio resources (handover, search) and for controlling a bearer service (radio bearer service control). The more complex function modes, such as registers, registration functions and mobility and location management, are located in each core network. For example, all signalling resulting from location update is thought to be forwarded to the core networks in the preferred embodiment of the invention after the processing according to the present invention.

In accordance with the UMTS terminology the entire UMITS access network is referred to as a Generic Radio Access Network, GRAN. The GRAN is further divided into a radio access network (RAN) and an interworking unit (IWU). Normally there is a specific IWU, like the IWUs 1–4 in the Figure, between each core network 2–5 and the RAN. The object of the IWU is a connection between the core network and the RAN. The IWU therefore comprises the necessary adaptations and other possible co-operative functions. The interface between IWU-CN is core network-specific. This enables the development of core networks and RAN irrespective of one another. For example, the IWU may be connected to a mobile switching centre of the GSM network or the PCS network. Correspondingly IWU2 may be connected to, for example, the local switching centre of the ISDN network.

In FIG. 3 the radio access network RAN comprises a transmission network TN, a radio network controller RNC and a base station BS. In the network architecture described the base stations are connected to the transmission network TN transferring user data to the IWU and control signalling to the radio network controller RNC. All intelligence controlling the GRAN is located at base stations (BS) and in the radio network controller (RNC). As noted above, the control is typically restricted to the control functions associated with radio access as well as to the switching of connections through the transmission network TN. The transmission network TN may, for example, be an ATM network.

Figure 1:
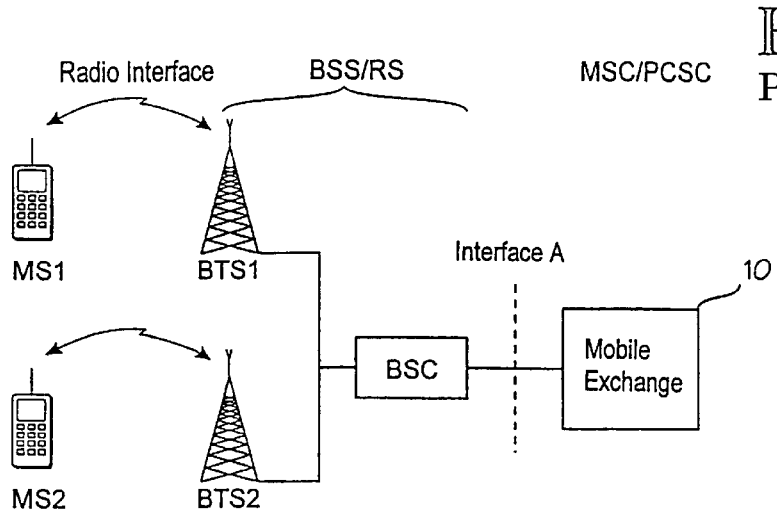
FIG. 1 illustrates the structure and interfaces of the GSM or PCS mobile networks.
Figure 2:
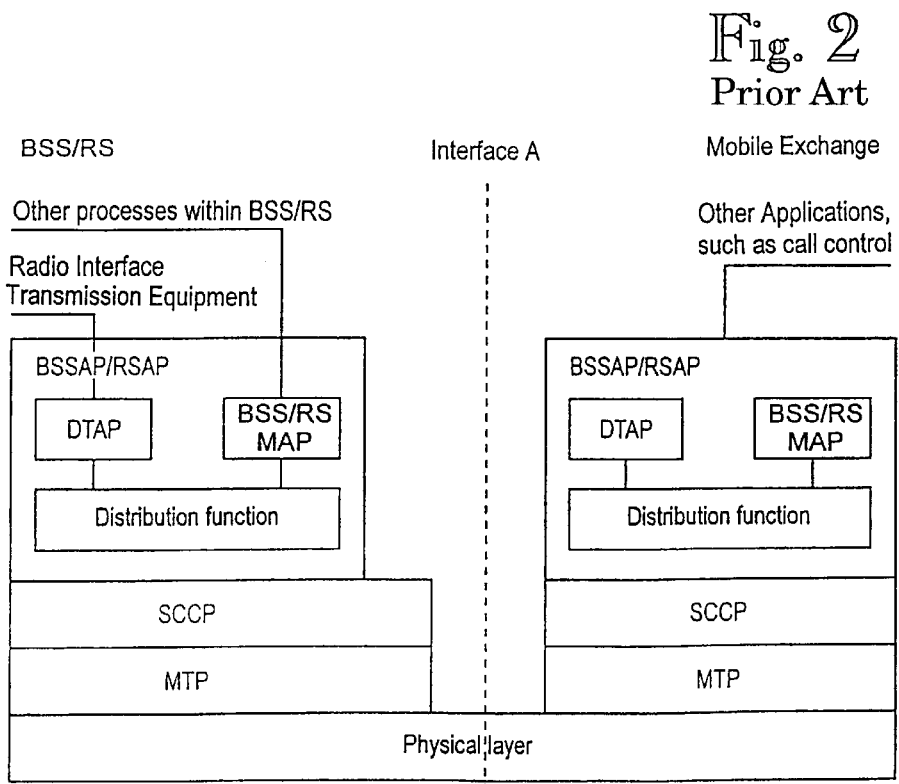
FIG. 2 shows a prior art protocol stack at interface A, when the physical layer is a digital PCM link.

As for the invention it is possible to consider the radio network control RNC as a counterpart of the base station control BSC of the GSM network comprising an interface A with the mobile switching centre of the GSM network through IWU1. IWU1 may also be unnecessary. Let us further assume that the ATM transmission technique is employed between IWU1 and the mobile switching centre, we have a situation corresponding to the BSC-MSC connection and the protocol stacks in the GSM network in FIGS. 1 and 2. IWU1 may also be unnecessary. On the other hand, the other one of the protocol stacks may be located in IWU1, for example, if there is a conventional PCM link between IWU1 and the MSC. However, it should be understood that the invention is applicable between any two network elements in wireless telecommunication systems.

Figure 5:
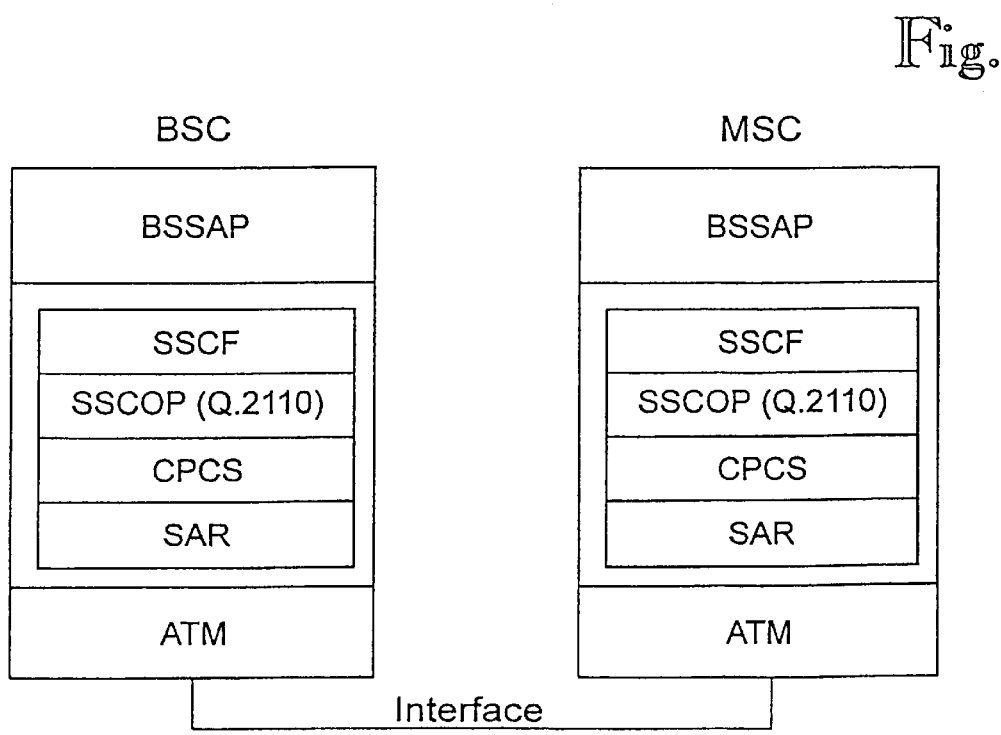
FIG. 5 shows a protocol stack of the invention at interface A in the transmission system based on ATM technique.

FIG. 5 shows the protocol stack of the invention for signalling between two network elements, such as BSC and MSC.

The layer 3 user function, in this example BSSAP or RSAP, is on the top of the protocol stack. However, the invention is applicable to be used with other corresponding user functions. It is characteristic of the BSSAP and the RSAP that they are user-specific, for example, in point-to-point calls the BSSAP uses one (SSCF) signalling connection for each active mobile station having one or more transactions for conveying the layer 3 messages.

The protocol stack in FIG. 5 comprises a new SSCF located between the SSCOP and the user function e.g. BSSAP or RSAP, while the SCCP, MTP3 and the SSCF according to ITU-T Q.2140 found in the prior art protocol stack are omitted. The other AAL sublayers SSCOP, CPCS and SAR are in accordance with ITU-T standards as well as the ATM layer and the physical layer.

The SSCF is used to support signalling messages between the user functions BSSAP of two network elements. The SSCF has two preferred functions:

1) to arrange the BSSAP requirements with the SSCOP requirements. This means matching primitives used towards the next higher layer with SSCF messages to be sent to the next lower layer.

2) management (establishment, release) and discrimination (distribution of messages to and from the BSSAP) of many signalling connections. In the preferred embodiment of the invention this is based on a similar allocation and change of connection reference numbers used in the SCCP. For a more detailed description of the SCCP reference is made to ETSI/GSM specification 08.06. The SCCP connections are described in detail in GSM 08.06 (version 4.4.1) chapter 6, pp 29–35.

In the following, the SCCF function according to the preferred embodiment of the invention is examined in call establishment, data transmission and connection release with reference to FIGS. 6–8 and Annex 1.

In the preferred embodiment of the invention the SSCF provides the following primitives for the higher layer BSSAP:

1) Primitives connected with call establishment: N_Connect_Request, N_Connect_Indication, N_Connect_Response, N_Connect_Confirmation.

2) Primitives connected with data transmission: N_Data_Request, N_Data_Indication, N_Unit_Data_Request, N_Unit_Data_Indication.

3) Primitives connected with connection release: N_Disconnect_Request, N_Disconnect_Indication.

Different SSCF messages are defined in Annex 1.

Call Establishment

A new SCCF connection is established when information has to be transferred between the BSC and the MSC, the information being associated with the communication between the mobile station MS and the network over an allocated radio resource, and when there is no SCCF connection associated with said mobile station MS between the MSC and the BSC. The new SCCF connection is established also at handover between cells within a base station system BSS. Either the MSC or the BSC can initiate call establishment. This procedure is similar to the SCCP call establishment.

Figure 6:
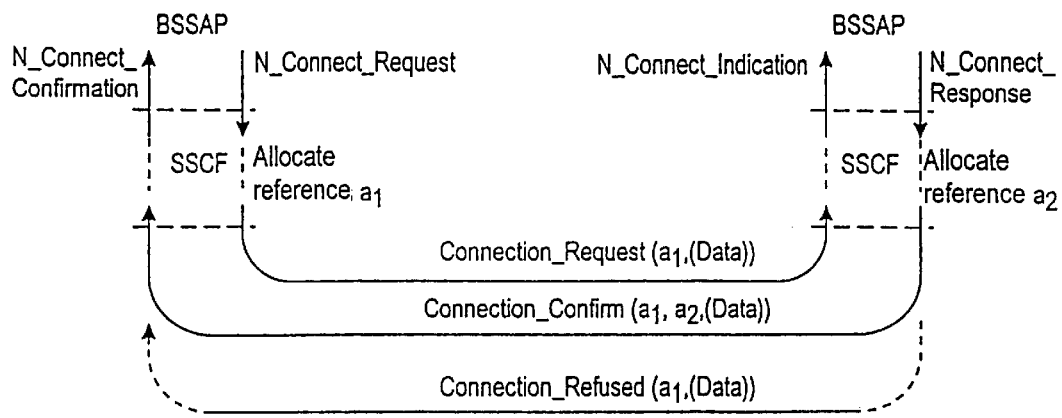
FIGS. 6, 7 and 8 are signalling diagrams illustrating the establishment, release of and data transmission over SSCP connections.
Figure 7:
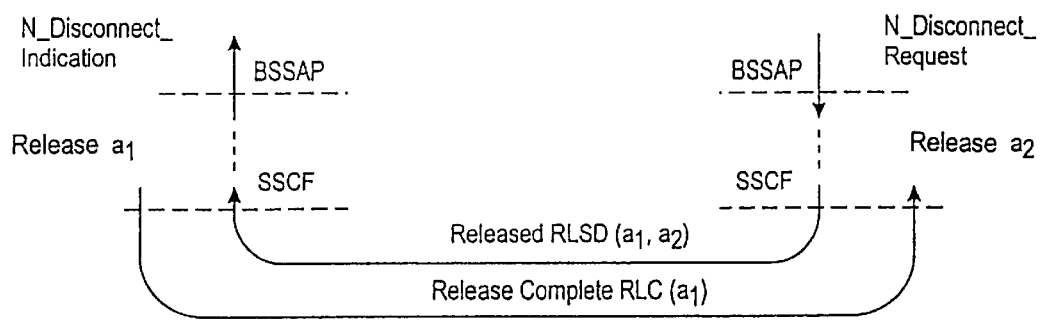

Referring to FIG. 6, when the BSC has received a relevant signalling message from the MS, the BSSAP issues the SSCF with a primitive N_Connect_Request which may comprise an BSSMAP message. The SSCF allocates an SSCF connection with a local connection reference a, to be used locally for identifying a connection. The connection reference may, for example, be a serial number. The connection reference connects (associates) the SSCF connection to a specific point or part in the BSSAP. The association enables the SSCF to distribute the layer 3 messages arriving from the BSSAP to the correct SSCF connections and vice versa. Hereafter the SSCF sends (through lower protocol layers) an SSCF message Connection_Request (CR). The CR message comprises a connection reference $a_1$ as the local reference of the source and possibly a BSSMAP message in the data field. The SSCF of the MSC receives the CR message and issues the BSSAP with a primitive N_Connect_Indication. The SSCF also allocates a local connection reference $a_2$ to the SSCF connection. The BSSAP of the MSC issues the SSCF with a primitive N_Connect_Response which may comprise a BSSMAP or a DTAP message or no data. The SSCF sends the BSC an SSCF message Connection_Confirm (CC) comprising the local address $a_2$ of the source and the local address $a_1$ of the destination. If the SSCF call establishment is for some reason rejected the SSCF of the MSC sends an SSCF message Connection_Refused (CREF) comprising the local reference a, of the destination. The CC, CR or CREF message may optionally comprise a BSSMAP or a DTAP message (or no user data) in the data field. When the SSCF of the BSC receives a CC message it issues the BSSAP with a primitive N_Connect_Confirmation.

The SSCF call establishment initiated by the MSC is similar, except that the data field of the CR message may comprise a BSSMAP or a DTAP message or no user data.

Connection Release

The MSC part always initiates a SSCF connection release. The connection is released when the MSC realizes that a signalling connection is no longer needed. With reference to FIG. 7, the BSSAP of the MSC issues the SSCF with a primitive N_Disconnect Request. The SSCF sends an SSCF message Released (RLSD) comprising references $a_1$ and $a_2$. The SSCF of the BSC issues the BSSAP with a primitive N_Disconnect_Indication to release the local connection reference $a_2$ and sends an SSCF message Release Complete (RLC). The SSCF of the MSC releases the local connection reference $a_1$.

BSSMAP and DTAP Data Transmission

Figure 4:
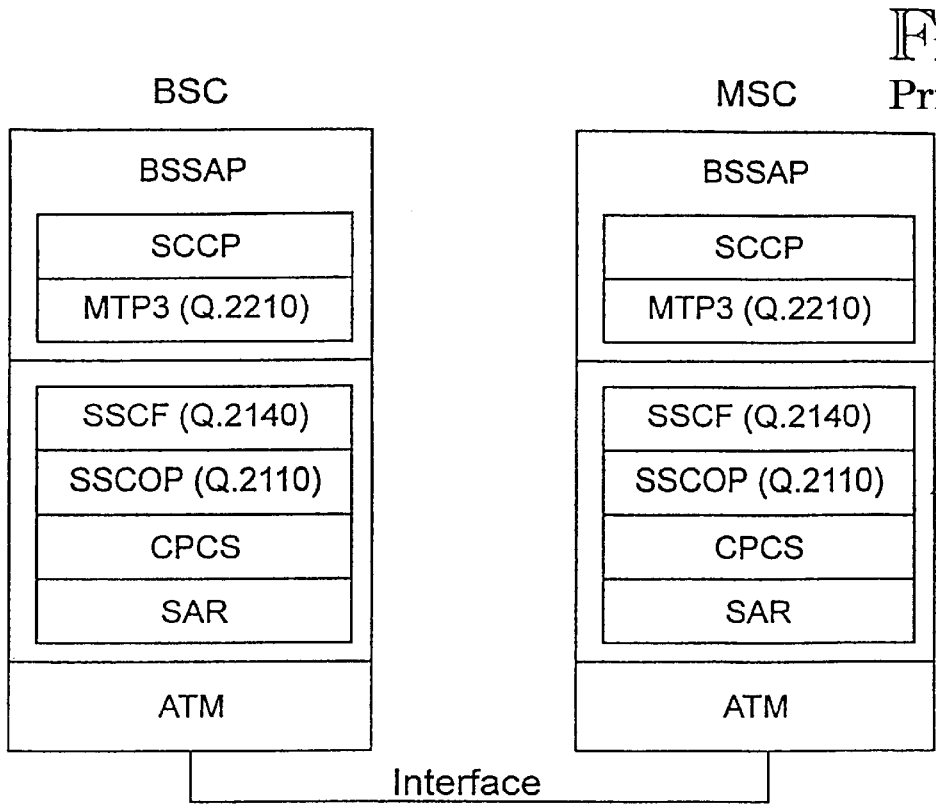
FIG. 4 shows a prior art protocol stack at interface A in the transmission system based on ATM technique.

The layer 3 BSSMAP and DTAP messages are included in the user data field of the SSCF messages. Dataform 1 (DT1) and Unitdata (UDT) are actual SSCF messages. The UDT messages are used in the BSSMAP procedures employing connectionless services. The distribution of messages between the BSSMAP and the DTAP functions and the distribution/multiplexing of the DTAP messages are performed in the distribution layer (BSSAP sublayer) described above, in the same way as in the protocol stacks in FIGS. 2 and 4. The procedure is described in GSM specification 08.06. This is based on the use of a Distribution Data Unit in the user data field in each SSCF data message. The distribution data unit comprises a discriminator parameter and a data link connection identifier parameter (DLCI). Since the distribution function is performed by said distribution layer in a manner known in the art, it will not here be described in greater detail.

Figure 8:
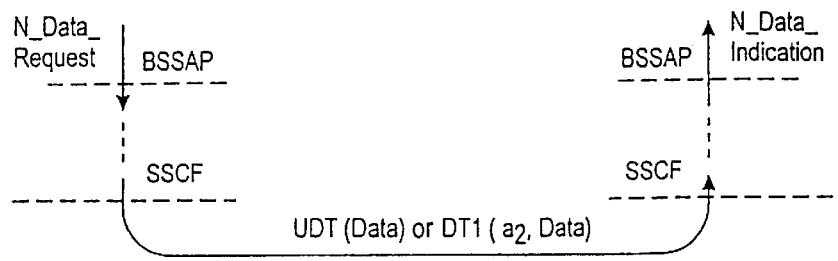

With reference to FIG. 8 data transmission takes place in such a manner that the BSSAP of the BSC issues the SSCF with a primitive N_Data_Request or in connectionless data transmission a N_Unit_Data_Request comprising a BSSMAP or a DTAP message to be sent. The SSCF inserts the BSSMAP or the DTAP message in a user data field in the SSCF message DT1 or UDT, of which DT1 also comprises the connection reference $a_2$ of the destination. The SSCF of the MSC issues the BSSAP with a primitive comprising said BSSMAP or DTAP message. Data transmission takes place in the same way in the opposite direction MC-BSC.

The application has above been described by means of the preferred embodiments to illustrate the principles of the invention. Regarding the details the invention may vary within the scope and spirit of the accompanying claims.

SSCF MESSAGES

| PARAMETER | LENGTH | VALUE | MANDATORY/OPTIONAL |
|---|---|---|---|
| Connection Request (CR) | | | |
| MESSAGE TYPE | 1 | 0000 0001 | M P |
| SOURCE LOCAL REFERENCE | 3 | | M P |
| DATA | N | | O O |
| Connection Confirm (CC) | | | |
| MESSAGE TYPE | 1 | 0000 0010 | M |
| DESTINATION LOCAL REFERENCE | 3 | | M |
| SOURCE LOCAL REFERENCE | 3 | | M |
| DATA | N | | O |
| Connection REFused (CREF) | | | |
| MESSAGE TYPE | 1 | 0000 0011 | M |
| DESTINATION LOCAL REFERENCE | 3 | | M |
| REFUSAL CAUSE | 1 | | M |
| DATA | N | | O |
| ReLeaSeD (RLSD) | | | |
| MESSAGE TYPE | 1 | 0000 0100 | M |
| DESTINATION LOCAL REFERENCE | 3 | | M |
| SOURCE LOCAL REFERENCE | 3 | | M |
| RELEASE CAUSE | 1 | | M |
| DATA | N | | O |
| ReLease Complete (RLC) | | | |
| MESSAGE TYPE | 1 | 0000 0101 | M |
| DESTINATION LOCAL REFERENCE | 3 | | M |
| DATA | N | | O |
| DaTa form 1(DT1) | | | |
| MESSAGE TYPE | 1 | 0000 0110 | M |
| DESTINATION LOCAL REFERENCE | 3 | | M |
| DATA | N | | O |
| UnitDaTa (UDT) | | | |
| MESSAGE TYPE | 1 | 0000 1001 | M |
| DATA | N | | M |

What is claimed is:
1. A signalling arrangement between network elements in a wireless telecommunication system having an asynchro- nous transfer mode (ATM)-based transmission system, the arrangement comprising a protocol stack which comprises, from top to bottom, a layer 3 user function for signalling between a wireless mobile station and a network, an ATM adaptation layer ATM layer and physical layer, wherein said ATM adaptation layer comprising on top a service-specific coordination function immediately between said layer 3 user function and a service-specific connection-oriented protocol, said service-specific coordination function comprising as functions the adaptation of the user function to the service-specific connection-oriented protocol and the establishment, discrimination and release of the signalling connections of the ATM adaptation layer needed for conveying signalling messages of said layer 3 user function.

2. A system as claimed in claim 1, wherein said user function employs one signalling connection for each wireless mobile station having one or more signalling transactions underway.

3. A system as claimed in claim 1 wherein said user function comprises one of the following: a BSS application part and a radio system application part.

4. A system as claimed in claim 1, wherein said service-specific connection-oriented protocol is in accordance with ITU-T standard Q.2110.

* * * * *